(12) United States Patent
Liu et al.

(10) Patent No.: US 12,375,009 B2
(45) Date of Patent: Jul. 29, 2025

(54) MULTI-INPUT POWER CONVERTER AND ONLINE UNINTERRUPTIBLE POWER SUPPLY INCLUDING MULTI-INPUT POWER CONVERTER

(71) Applicant: SANTAK ELECTRONIC (SHENZHEN) CO., LTD., Shenzhen (CN)

(72) Inventors: Dan Liu, Shenzhen (CN); Lei Cao, Shenzhen (CN); Dawei Zheng, Shenzhen (CN); Huahong Ning, Shenzhen (CN); Pingchang Lin, Shenzhen (CN)

(73) Assignee: Santak Electronic (Shenzhen) Co., Ltd., Shenzhen (CN)

( * ) Notice: Subject to any disclaimer, the term of this patent is extended or adjusted under 35 U.S.C. 154(b) by 146 days.

(21) Appl. No.: 18/315,760

(22) Filed: May 11, 2023

(65) Prior Publication Data

US 2023/0369989 A1 Nov. 16, 2023

(30) Foreign Application Priority Data

May 11, 2022 (CN) .......................... 202210515019.4

(51) Int. Cl.
*H02M 7/487* (2007.01)
*H02J 9/06* (2006.01)
*H02M 7/5387* (2007.01)

(52) U.S. Cl.
CPC ............. *H02M 7/487* (2013.01); *H02J 9/063* (2020.01); *H02M 7/53871* (2013.01); *H02J 2207/20* (2020.01)

(58) Field of Classification Search
CPC .......................... F41H 13/0025; F41H 13/0018
USPC .......................................................... 361/232
See application file for complete search history.

(56) References Cited

U.S. PATENT DOCUMENTS

| | | | |
|---|---|---|---|
| 2005/0225914 A1* | 10/2005 | King ...................... | H02J 9/061 361/62 |
| 2012/0275201 A1* | 11/2012 | Koyama ................. | H02M 7/48 363/40 |
| 2015/0194902 A1* | 7/2015 | Tian ..................... | H02M 7/4833 363/37 |
| 2021/0050773 A1* | 2/2021 | Lin ........................ | H02M 1/10 |
| 2021/0135577 A1* | 5/2021 | Li ......................... | H02M 3/1584 |
| 2022/0302853 A1* | 9/2022 | Yang .................... | H02M 7/5395 |

* cited by examiner

*Primary Examiner* — Yemane Mehari
(74) *Attorney, Agent, or Firm* — Stanek Lemon Crouse & Meeks, PA

(57) ABSTRACT

A multi-input power converter includes three bridge arm units connected between a three-phase AC power supply and a positive/negative DC bus. First and second capacitors are connected in series between the positive and negative DC buses with a node connected to a neutral point. Each bridge arm unit includes an inductor and a bidirectional switch unit connected in series with a node connected to a current direction control bridge arm between the positive and negative DC buses. Second ends of bidirectional switch units are connected to the neutral point. In a battery mode, two of the bridge arm units are as battery mounting bridge arms to constitute a DC loop with a rechargeable battery to supply power to the positive and negative DC buses, and the remaining bridge arm unit enables an inductor thereon to alternately connect the positive and negative DC buses to balance a bus capacitance voltage.

11 Claims, 7 Drawing Sheets

MULTI-INPUT POWER CONVERTER AND ONLINE UNINTERRUPTIBLE POWER SUPPLY INCLUDING MULTI-INPUT POWER CONVERTER

CROSS-REFERENCE TO RELATED APPLICATIONS

The present application claims priority to Chinese Patent Application No. 202210515019.4; Filed May 11, 2022, entitled MULTI-INPUT POWER CONVERTER AND ONLINE UNINTERRUPTIBLE POWER SUPPLY INCLUDING MULTI-INPUT POWER CONVERTER that is incorporated herein by reference in its entirety.

TECHNICAL FIELD

The present disclosure relates to the field of power management, in particular to a multi-input power converter and an online uninterruptible power supply including the multi-input power converter.

BACKGROUND

As an uninterruptible power supply apparatus that is widely used in the industrial field, an uninterruptible power supply mainly includes several components: a rectifier, an inverter, an alternating current static switch, a battery pack, and the like. When a voltage of mains electricity is normal, the uninterruptible power supply is in an online mode, and the mains electricity supplies power to a load; and when the voltage of mains electricity is abnormal or power outage occurs, the uninterruptible power supply is in a battery mode, and the inverter is controlled to operate to convert a direct current provided by a rechargeable battery pack into an alternating current and supply power to the load.

A Vienna rectifier circuit is a three-level conversion circuit topology that converts a three-phase alternating current into a direct current. Compared with a common two-level rectifier, for example, a three-phase six-switch rectifier, a rectifier using the Vienna rectifier circuit has the advantages of less stress borne by a power component, higher power density, and less input current distortion. Compared with a common three-level converter, the rectifier using the Vienna rectifier circuit has the advantages of a simple circuit, less power components, and no possibility of bridge arm shoot through, which avoids a setting of dead time. In addition, this reduces a switching loss and control complexity, and improves reliability.

However, an uninterruptible power supply having a feature of the Vienna rectifier circuit in existing technology usually needs to be designed separately for a circuit for the online mode and a circuit for the battery mode. This requires a large quantity of elements in this relatively complex circuit, resulting in high costs. In addition, the separate arrangement of the two circuits makes an overall size of the uninterruptible power supply large, which is not conducive to miniaturization.

SUMMARY

To resolve the foregoing technical problem in the existing technology, in a first aspect, the present disclosure provides a multi-input power converter. The multi-input power converter obtains power from a three-phase alternating current power supply or a rechargeable battery and outputs direct current power to a positive direct current bus and a negative direct current bus, where a first capacitor and a second capacitor are connected in series between the positive direct current bus and the negative direct current bus, and a first node formed by connecting the first capacitor to the second capacitor is connected to a neutral point;

the multi-input power converter includes a first bridge arm unit, a second bridge arm unit, and a third bridge arm unit, and each bridge arm unit includes an inductor and a bidirectional switch unit that are connected in series, and a current direction control bridge arm connected between the positive direct current bus and the negative direct current bus, where a first end of the inductor is connected to a corresponding phase of the three-phase alternating current power supply, a second node formed by connecting a second end of the inductor to a first end of the bidirectional switch unit is connected to a corresponding current direction control bridge arm, and a second end of the bidirectional switch unit is connected to the first node;

wherein, a first end of an inductor of the first bridge arm unit is connected to a positive electrode of the rechargeable battery via a first direct current switch, and a first end of an inductor of the second bridge arm unit is connected to a negative electrode of the rechargeable battery via a second direct current switch, so that the positive direct current bus and the negative direct current bus can be powered by the rechargeable battery; and a first end of an inductor of the third bridge arm unit is connected to the neutral point via a bidirectional conductive switch, and a current direction control bridge arm of the third bridge arm unit includes a bidirectional controllable element, where the bidirectional controllable element is controlled to enable a second end of the inductor of the third bridge arm unit to alternately connect to one of the positive direct current bus and the negative direct current bus.

In one embodiment, respective current direction control bridge arms of the first bridge arm unit, the second bridge arm unit, and the third bridge arm unit each are configured to enable a current to flow in a direction from the negative direct current bus to the positive direct current bus, where the current direction control bridge arm of the first bridge arm unit and the current direction control bridge arm of the second bridge arm unit each include a first unidirectional conductive element and a second unidirectional conductive element that are connected in series in a same direction, and a node formed by connecting the first unidirectional conductive element to the second unidirectional conductive element is a second node of a corresponding bridge arm unit; and the current direction control bridge arm of the third bridge arm unit includes a first bidirectional controllable element and a second bidirectional controllable element that are connected in series in a same direction, and the first bidirectional controllable element and the second bidirectional controllable element are further configured to control the current to flow in a direction from the positive direct current bus to the negative direct current bus.

In one embodiment, the first bidirectional controllable element of the third bridge arm unit is a first transistor with an anti-parallel diode, the second bidirectional controllable element is a second transistor with an anti-parallel diode, and the first transistor and the second transistor are configured to control the current to flow in the direction from the positive direct current bus to the negative direct current bus.

In one embodiment, in response to the positive direct current bus and the negative direct current bus being powered by the rechargeable battery, the third bridge arm unit is configured to keep the bidirectional conductive switch on, and the first transistor and the second transistor are alternately and complementarily turned on, to enable the voltage across the first capacitor and the voltage across the second capacitor tend to be balanced.

In one embodiment, duty cycles of alternating complementary conduction of the first transistor and the second transistor each are 50%.

In one embodiment, in a battery mode, the first bridge arm unit and the second bridge arm unit are configured to alternately perform the following operations:
 enabling bidirectional switch units of the first bridge arm unit and the second bridge arm unit to be turned on simultaneously, and constituting a direct current loop with the rechargeable battery, so that the inductor of the first bridge arm unit and the inductor of the second bridge arm unit store energy; and
 enabling the bidirectional switch units of the first bridge arm unit and the second bridge arm unit to be turned off simultaneously, so that the rechargeable battery, the inductor of the first bridge arm unit, the inductor of the second bridge arm unit, the first capacitor, and the second capacitor are connected in series, to supply power to the positive direct current bus and the negative direct current bus.

In one embodiment, the bidirectional conductive switch is a bidirectional SCR; or at least one of the first direct current switch and the second direct current switch is a unidirectional SCR.

In one embodiment, the multi-input power converter includes a control module and a collection module configured to collect an electrical signal of the multi-input power converter, where the control module controls, based on the electrical signal, the multi-input power converter to switch between a mains electricity mode and the battery mode, or controls, in the battery mode, an on-off state of the bidirectional controllable element of the third bridge arm unit, to enable the voltage across the first capacitor and the voltage across the second capacitor tend to be balanced.

In one embodiment, the bidirectional switch unit of each bridge arm unit includes a first diode, a second diode, a third diode, a fourth diode, and a third transistor with an antiparallel diode, where
 an anode of the first diode is connected to a cathode of the second diode, and a node formed by connecting the two diodes is used as the first end of the bidirectional switch unit;
 an anode of the third diode is connected to a cathode of the fourth diode, and a node formed by connecting the two diodes is used as the second end of the bidirectional switch unit;
 a cathode of the first diode is connected to a cathode of the third diode, and a node formed by connecting the two diodes is connected to a first end of the third transistor;
 an anode of the second diode is connected to an anode of the fourth diode, and a node formed by connecting the two diodes is connected to a second end of the third transistor; and
 an on state of the third transistor enables the current to flow from the first end of the third transistor to the second end.

In one embodiment, the first transistor, the second transistor, or the third transistor is an insulated gate bipolar transistor or a metal-oxide-semiconductor field-effect transistor.

In another aspect, the present disclosure provides an uninterruptible power supply, including:
 the multi-input power converter according to the first aspect of the present disclosure;
 a rechargeable battery, where a positive electrode and a negative electrode of the rechargeable battery are respectively connected to a positive direct current bus and a negative direct current bus via a first bridge arm unit and a second bridge arm unit; and
 an inverter, where a positive terminal and a negative terminal at an input end of the inverter are respectively connected to the positive direct current bus and the negative direct current bus, and an output end of the inverter is connected to an alternating current output end.

According to the multi-input power converter in the present disclosure, a mains electricity input circuit required for an online mode and a battery mounting circuit required for a battery power supply mode are efficiently and beneficially integrated, electric potential imbalance between the positive direct current bus and the negative direct current bus can be effectively improved, and a quantity of power elements required in a circuit is reduced as much as possible. The circuit is simple, power density is high, current distortion is reduced, and a switching loss is low. In this way, not only costs are reduced, miniaturization of device is more beneficial.

BRIEF DESCRIPTION OF THE DRAWINGS

The following further describes embodiments of the present disclosure with reference to the accompanying drawings, in which.

DETAILED DESCRIPTION

To make objectives, technical schemes, and advantages of the present disclosure clearer, the following further describes the present disclosure in detail by using specific embodiments with reference to the accompanying drawings.

Figure 1:
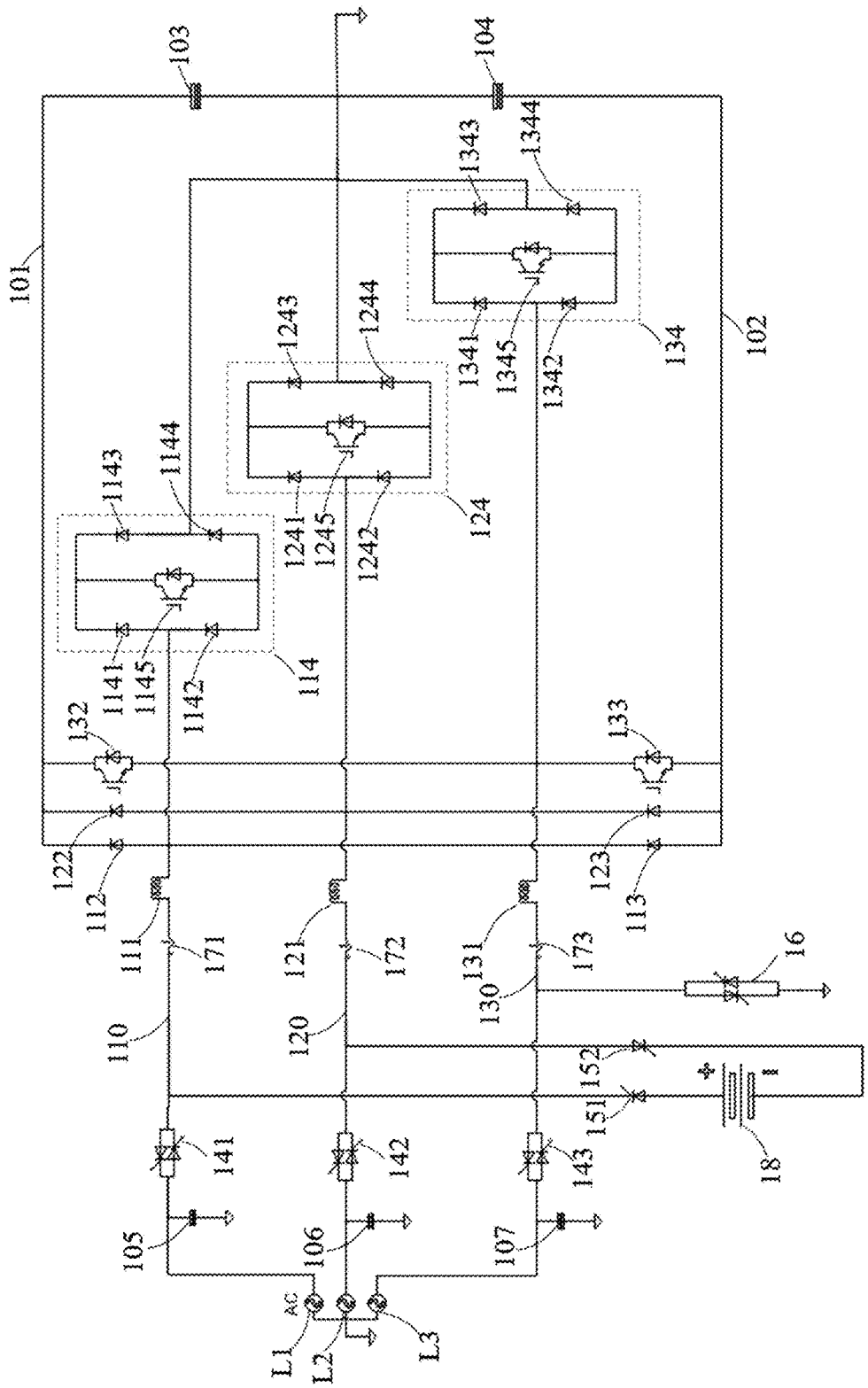
FIG. 1 exemplarily shows a schematic circuit diagram of a multi-input power converter according to an embodiment of the present disclosure.

According to a preferred embodiment of the present disclosure, a multi-input power converter circuit mainly includes an alternating current switch group, a direct current switch group, a freewheeling switch, and three bridge arm units. As shown in FIG. 1, the three bridge arm units of a multi-input power converter 1 include a first bridge arm unit 11, a second bridge arm unit 12, and a third bridge arm unit 13. The input ends of the multi-input power converter circuit 1 are respectively connected to an L1-phase alternating current power supply, an L2-phase alternating current power supply, and an L3-phase alternating current power supply of a three-phase alternating current power supply, and the output ends of the multi-input power converter circuit 1 are respectively connected to a positive direct current bus 101, a negative direct current bus 102, and a neutral point N. A first capacitor 103 and a second capacitor 104 are connected in series between the positive direct current bus 101 and the negative direct current bus 102, and a node formed by connecting the first capacitor 103 to the second capacitor 104 is also connected to the neutral point N.

The alternating current switch group includes a first bidirectional silicon controlled rectifier (SCR) 141, a second bidirectional SCR 142, and a third bidirectional SCR 143. The first bidirectional SCR 141 is connected between the L1-phase of the three-phase alternating current power supply and an input end 110 of the first bridge arm unit 11. The second bidirectional SCR 142 is connected between the L2-phase of the three-phase alternating current power supply and an input end 120 of the second bridge arm unit 12. The third bidirectional SCR 143 is connected between the L3-phase of the three-phase alternating current power supply and an input end 130 of the third bridge arm unit 13.

The direct current switch group includes a first unidirectional SCR 151 and a second unidirectional SCR 152. A cathode of the first unidirectional SCR 151 is connected to a node formed by connecting the first bidirectional SCR 141 to the input end 110 of the first bridge arm unit 11, and an anode of the first unidirectional SCR 151 is connected to a positive electrode of a rechargeable battery 18. An anode of the second unidirectional SCR 152 is connected to a node formed by connecting the second bidirectional SCR 142 to the input end 120 of the second bridge arm unit 12, and a cathode of the second unidirectional SCR 152 is connected to a negative electrode of the rechargeable battery 18. In addition, a bidirectional conductive switch is configured as a fourth bidirectional SCR 16, where one end of the fourth bidirectional SCR 16 is connected to a node formed by connecting the third bidirectional SCR 143 to the input end 130 of the third bridge arm unit, and the other end of the fourth bidirectional SCR 16 is connected to the neutral point N.

The three bridge arm units of the multi-input power converter circuit 1 have similar structures. The first bridge arm unit 11 includes a first inductor 111, a first diode 112, a second diode 113, and a first bidirectional switch unit 114. The first diode 112 and the second diode 113 are connected in series in a same direction to form a current unidirectional conductive circuit (rectifier bridge arm) whose current direction is directed from the negative direct current bus to the positive direct current bus. The first bidirectional switch unit 114 includes a third diode 1141, a fourth diode 1142, a fifth diode 1143, a sixth diode 1144, and a first insulated gate bipolar transistor 1145 with an anti-parallel diode. The second bridge arm unit 12 includes a second inductor 121, a seventh diode 122, an eighth diode 123, and a second bidirectional switch unit 124. The seventh diode 122 and the eighth diode 123 are connected in series in a same direction to form a current unidirectional conductive circuit (rectifier bridge arm) whose current direction is directed from the negative direct current bus to the positive direct current bus. The second bidirectional switch unit 124 includes a ninth diode 1241, a tenth diode 1242, an eleventh diode 1243, a twelfth diode 1244, and a second insulated gate bipolar transistor 1245 with an anti-parallel diode. The third bridge arm unit 13 includes a third inductor 131, a third insulated gate bipolar transistor 132 with an anti-parallel diode, a fourth insulated gate bipolar transistor 133 with an anti-parallel diode, and a third bidirectional switch unit 134. The third insulated gate bipolar transistor 132 with an anti-parallel diode and the fourth insulated gate bipolar transistor 133 with an anti-parallel diode are connected in series in a same direction to form a controllable bidirectional conductive circuit (where this controllable bidirectional conductive feature enables the circuit to be used as a rectifier bridge arm in a mains electricity mode and used as a part of a bus capacitance voltage balancing bridge arm in a battery mode). An on state of the insulated gate bipolar transistor 132 or 133 enables a current to flow from a collector to an emitter, or an off state of the transistor 132 or 133 enables a freewheeling current to flow through the anti-parallel diode of the transistor. The third bidirectional switch unit 134 includes a thirteenth diode 1341, a fourteenth diode 1342, a fifteenth diode 1343, a sixteenth diode 1344, and a fifth insulated gate bipolar transistor 1345 with an anti-parallel diode.

The structure of the first bridge arm unit 11 is as follows: A first end of the first inductor 111 is connected to the input end 110 of the first bridge arm unit 11, a second end of the first inductor 111 is connected to a first end of the first bidirectional switch unit 114 to form a node, and a positive electrode of the first diode 112 and a negative electrode of the second diode 113 each are connected to the node. A second end of the first bidirectional switch unit 114 is connected to the neutral point N. A negative electrode of the first diode 112 is connected to a first end of the first capacitor 103, a positive electrode of the second diode 113 is connected to a second end of the second capacitor 104, and a node formed by connecting a second end of the first capacitor 103 to a first end of the second capacitor 104 is connected to the neutral point N.

A structure of the first bidirectional switch unit 114 is as follows: An anode of the third diode 1141 is connected to a cathode of the fourth diode 1142, and a node formed between the anode of the third diode 1141 and the cathode of the fourth diode 1142 is connected to the first end of the first bidirectional switch unit 114. An anode of the fifth diode 1143 is connected to a cathode of the sixth diode 1144, and a node formed between the anode of the fifth diode 1143 and the cathode of the sixth diode 1144 is connected to the second end of the first bidirectional switch unit 114. A cathode of the third diode 1141 is connected to a cathode of the fifth diode 1143, and a node formed between the cathode of the third diode 1141 and the cathode of the fifth diode 1143 is connected to a collector of the first insulated gate bipolar transistor 1145. An anode of the fourth diode 1142 is connected to an anode of the sixth diode 1144, and a node formed between the anode of the fourth diode 1142 and the anode of the sixth diode 1144 is connected to an emitter of the first insulated gate bipolar transistor 1145.

Similar to the first bridge arm unit 11, the structure of the second bridge arm unit 12 is as follows: A first end of the second inductor 121 is connected to the input end 120 of the second bridge arm unit 12, a second end of the second inductor 121 is connected to a first end of the second bidirectional switch unit 124 to form a node, and a positive electrode of the seventh diode 122 is connected to a negative electrode of the eighth diode 123 via the node. A second end of the second bidirectional switch unit 124 is connected to the neutral point N. A negative electrode of the seventh diode 122 is connected to the first end of the first capacitor 103, and a positive electrode of the eighth diode 123 is connected to the second end of the second capacitor 104.

A structure of the second bidirectional switch unit 124 is as follows: An anode of the ninth diode 1241 is connected to a cathode of the tenth diode 1242, and a node formed between the anode of the ninth diode 1241 and the cathode of the tenth diode 1242 is connected to the first end of the second bidirectional switch unit 124. An anode of the eleventh diode 1243 is connected to a cathode of the twelfth diode 1244, and a node formed between the anode of the eleventh diode 1243 and the cathode of the twelfth diode 1244 is connected to the second end of the second bidirectional switch unit 124. A cathode of the ninth diode 1241 is connected to a cathode of the eleventh diode 1243, and a node formed between the cathode of the ninth diode 1241 and the cathode of the eleventh diode 1243 is connected to a collector of the second insulated gate bipolar transistor 1245. An anode of the tenth diode 1242 is connected to an anode of the twelfth diode 1244, and a node formed between the anode of the tenth diode 1242 and the anode of the twelfth diode 1244 is connected to an emitter of the second insulated gate bipolar transistor 1245.

The structure of the third bridge arm unit is as follows: A first end of the third inductor 131 is used as the input end 130 of the third bridge arm unit 13 and is connected to the third bidirectional SCR 143, a second end of the third inductor 131 is connected to a first end of the third bidirectional switch unit 134 to form a node, an emitter of the third insulated gate bipolar transistor 132 is connected to a collector of the fourth insulated gate bipolar transistor 133 via the node, and a second end of the third bidirectional switch unit 134 is connected to the neutral point N. A collector of the third insulated gate bipolar transistor 132 is connected to the positive direct current bus 101 and the first end of the first capacitor 103, and an emitter of the fourth insulated gate bipolar transistor 133 is connected to the negative direct current bus 102 and the second end of the second capacitor 104.

A structure of the third bidirectional switch unit 134 is as follows: An anode of the thirteenth diode 1341 is connected to a cathode of the fourteenth diode 1342, and a node formed between the anode of the thirteenth diode 1341 and the cathode of the fourteenth diode 1342 is connected to the first end of the third bidirectional switch unit 134. An anode of the fifteenth diode 1343 is connected to a cathode of the sixteenth diode 1144, and a node formed between the anode of the fifteenth diode 1343 and the cathode of the sixteenth diode 1344 is connected to the second end of the third bidirectional switch unit 134. A cathode of the thirteenth diode 1341 is connected to a cathode of the fifteenth diode 1343, and a node formed between the cathode of the thirteenth diode 1341 and the cathode of the fifteenth diode 1343 is connected to a collector of the fifth insulated gate bipolar transistor 1345. An anode of the fourteenth diode 1342 is connected to an anode of the sixteenth diode 1344, and a node formed between the anode of the fourteenth diode 1342 and the anode of the sixteenth diode 1344 is connected to an emitter of the fifth insulated gate bipolar transistor 1345.

In this embodiment, a first current transformer 171 is further disposed between the input end 110 of the first bridge arm unit 11 and the first inductor 111, a second current transformer 172 is further disposed between the input end 120 of the second bridge arm unit 12 and the second inductor 121, and a third current transformer 173 is further disposed between the input end 130 of the third bridge arm unit 13 and the third inductor 131.

For pre-filtering, a node formed by connecting the L1-phase power supply of the three-phase alternating current power supply to the first bidirectional SCR 141 is connected to a first end of an additional third capacitor 105, and a second end of the third capacitor 105 is connected to the neutral point N. A node formed by connecting the L2-phase power supply to the second bidirectional SCR 142 is further connected to a first end of an additional fourth capacitor 106, and a second end of the fourth capacitor 106 is connected to the neutral point N. A node formed by connecting the L3-phase power supply to the third bidirectional SCR 143 is further connected to a first end of an additional fifth capacitor 107, and a second end of the fifth capacitor 107 is connected to the neutral point N. However, in another embodiment, the filter capacitor structure may be omitted or replaced with another known filter circuit structure.

In the multi-input power converter in this embodiment, the negative electrode of the first diode 112, the negative electrode of the seventh diode 122, and the collector of the third insulated gate bipolar transistor 132 are connected in parallel to the first end of the first capacitor 103 to form the positive direct current bus 101. The positive electrode of the second diode 113, the positive electrode of the eighth diode 123, and the emitter of the fourth insulated gate bipolar transistor 133 are connected in parallel to the second end of the second capacitor 104 to form the negative direct current bus 102.

Operation modes and functions of the multi-input power converter are described below.

First Operation Mode (Mains Electricity Mode):

When L1, L2, and L3 of the three-phase alternating current power supply are normal, the first bidirectional SCR 141, the second bidirectional SCR 142, and the third bidirectional SCR 143 in the alternating current switch group are controlled to be turned on, the first unidirectional SCR 151 and the second unidirectional SCR 152 in the direct current switch group are controlled to be turned off, and the fourth bidirectional SCR 16 is controlled to be turned off. In this case, the alternating current power input by the three-phase alternating current power supply is converted into direct current power by the multi-input power converter 1, to supply power to the positive direct current bus 101 and the negative direct current bus 102.

Operation principles of the first bridge arm unit, the second bridge arm unit, and the third bridge arm unit that are respectively connected to the L1-phase power supply, the L2-phase power supply, and the L3-phase power supply are similar, which are illustrated with examples as follows.

For the first bridge arm unit, when the L1-phase power supply is in a positive half cycle of operation, if the first insulated gate bipolar transistor 1145 is turned on, a current flow direction is: L1-phase power supply→first bidirectional SCR 141→first inductor 111→third diode 1141→first insulated gate bipolar transistor 1145→sixth diode 1144→neutral point N, where the first inductor 111 stores energy. If the first insulated gate bipolar transistor 1145 is turned off, a current flow direction is: L1-phase power supply→first bidirectional SCR 141→first inductor 111→first diode 112→first capacitor 103→neutral point N, where the first inductor 111 releases energy, which is equivalent that the L1-phase power supply and the first inductor 111 are connected in series to jointly provide electric energy to a load.

When the L1-phase power supply is in a negative half cycle of operation, if the first insulated gate bipolar transistor 1145 is turned on, a current flow direction is: neutral point N→fifth diode 1143→first insulated gate bipolar transistor 1145→fourth diode 1142→first inductor 111→first bidirectional SCR 141→L1-phase power supply, where the first inductor 111 stores energy. If the first insulated gate bipolar transistor 1145 is turned off, a current flow direction is: neutral point N→second capacitor 104→second diode 113→first inductor 111→first bidirectional SCR 141→L1- phase power supply, where the first inductor 111 releases energy, which is equivalent that the L1-phase power supply and the first inductor 111 are connected in series to jointly provide electric energy to a load.

Components and connection relationships of the second bridge arm unit are similar to those of the first bridge arm unit, and an operation process of the second bridge arm unit is not described herein again.

An operation manner of the third bridge arm unit is basically the same as that of the first bridge arm unit. A difference between the third bridge arm unit and the first bridge arm unit lies in that: The first diode 112 is replaced with the third insulated gate bipolar transistor 132 with an anti-parallel freewheeling diode, and a unidirectional conductive function of the first diode 112 is implemented by the anti-parallel freewheeling diode on the third insulated gate bipolar transistor 132. The second diode 113 is replaced with the fourth insulated gate bipolar transistor 133 with an anti-parallel freewheeling diode, and a unidirectional conductive function of the second diode 113 is implemented by the anti-parallel freewheeling diode on the fourth insulated gate bipolar transistor 133. An operation manner is as follows:

When the L3-phase power supply is in a positive half cycle of operation, if the fifth insulated gate bipolar transistor 1345 is turned on, a current flow direction is: L3-phase power supply→third bidirectional SCR 143→third inductor 131→thirteenth diode 1341→fifth insulated gate bipolar transistor 1345→sixteenth diode 1344→neutral point N. If the fifth insulated gate bipolar transistor 1345 is turned off, a current flow direction is: L3-phase power supply→third bidirectional SCR 143→third inductor 131→anti-parallel freewheeling diode on the third insulated gate bipolar transistor 132→first capacitor 103→neutral point N.

When the L3-phase power supply is in a negative half cycle of operation, if the fifth insulated gate bipolar transistor 1345 is turned on, a current flow direction is: neutral point N→fifteenth diode 1343→fifth insulated gate bipolar transistor 1345→fourteenth diode 1342→third inductor 131→third bidirectional SCR 143→L3-phase power supply, where the third inductor 131 stores energy. If the fifth insulated gate bipolar transistor 1345 is turned off, a current flow direction is: neutral point N→second capacitor 104→diode on the fourth insulated gate bipolar transistor 133→third inductor 131→third bidirectional SCR 143→L3-phase power supply.

According to the multi-input power converter in the first operation mode in this embodiment, the alternating current of the three-phase alternating current power supply including L1, L2, and L3 can be transmitted to the positive direct current bus and the negative direct current bus 102, to supply power to the load.

Second Operation Mode (Battery Mode):

When L1, L2, and L3 of the three-phase alternating current power supply are abnormal or power outage occurs, and the rechargeable battery 18 is charged, the multi-input power converter circuit is controlled to switch from disconnecting from mains electricity by disconnecting the alternating current switch group to obtaining the direct current power supply from the rechargeable battery 18. In the battery mode, the first bridge arm unit and the second bridge arm unit can be reused as battery mounting bridge arms of the rechargeable battery 18.

In the battery mode, the first bidirectional SCR 141, the second bidirectional SCR 142, and the third bidirectional SCR 143 in the alternating current switch group are controlled to be turned off, the first unidirectional SCR 151 and the second unidirectional SCR 152 in the direct current switch group are controlled to be turned on, and the fourth bidirectional SCR 16 is controlled to be turned on. In addition, the first insulated gate bipolar transistor 1145 and the second insulated gate bipolar transistor 1245 are controlled to alternately keep on or off simultaneously, and the fifth insulated gate bipolar transistor 1345 of the third bridge arm unit is further controlled to keep off during the foregoing process.

Figure 2:
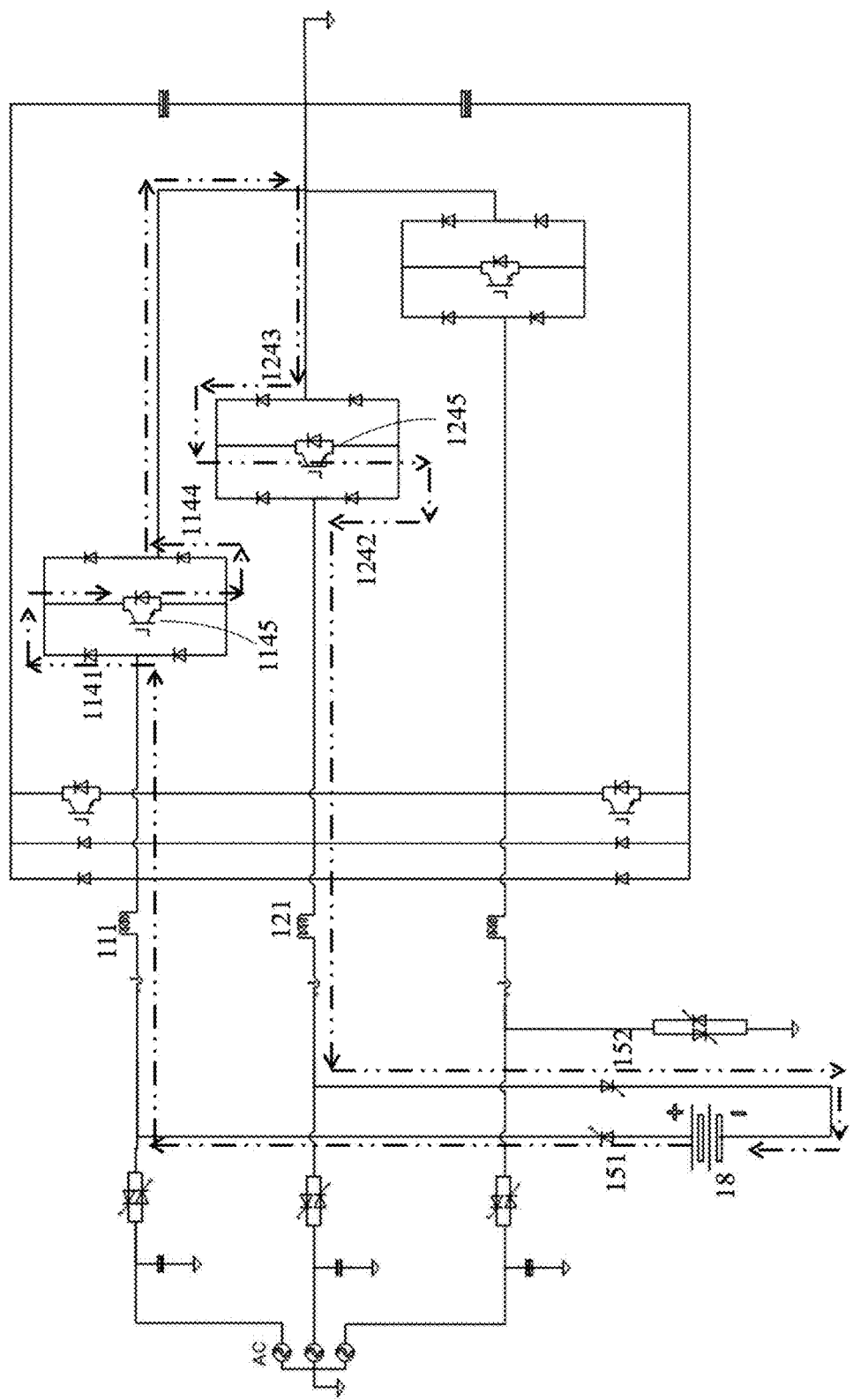
FIG. 2 and FIG. 3 each exemplarily show an equivalent circuit diagram of the multi-input power converter in a second operation mode.
Figure 3:
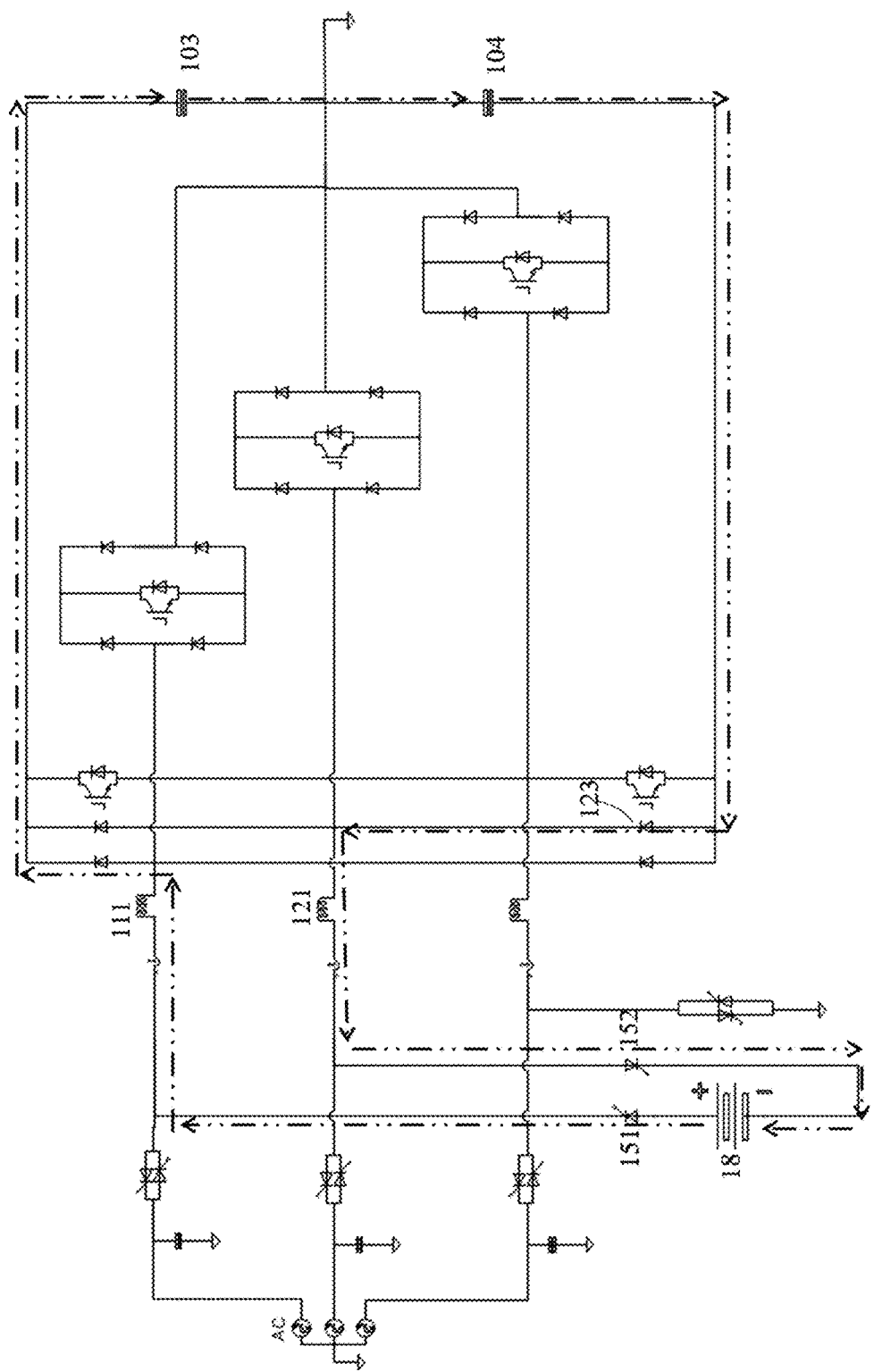

FIG. 2 and FIG. 3 each show an equivalent circuit diagram of the multi-input power converter in a second operation mode.

When the first insulated gate bipolar transistor 1145 and the second insulated gate bipolar transistor 1245 are simultaneously turned on, as shown in FIG. 2, a current flow direction is: positive electrode of the rechargeable battery 18→first unidirectional SCR 151→first inductor 111→third diode 1141→first insulated gate bipolar transistor 1145→sixth diode 1144→eleventh diode 1243→second insulated gate bipolar transistor 1245→tenth diode 1242→second inductor 121→second unidirectional SCR 152→negative electrode of the rechargeable battery 18. In this process, the first inductor 111 and the second inductor 121 are charged by the rechargeable battery 18.

When the first insulated gate bipolar transistor 1145 and the second insulated gate bipolar transistor 1245 are simultaneously turned off, as shown in FIG. 3, a current flow direction is: positive electrode of the rechargeable battery 18→first unidirectional SCR 151→first inductor 111→first diode 112→first capacitor 103→second capacitor 104→eighth diode 123→second inductor 121→second unidirectional SCR 152→negative electrode of the rechargeable battery 18. In this process, the first inductor 111 and the second inductor 121 release electric energy and supply power to the positive direct current bus 101 and the negative direct current bus 102 together with the rechargeable battery 18.

Third Operation Mode (Voltage Balancing Mode):

In the second operation mode in which the rechargeable battery 18 supplies power, the voltage level across the first capacitor 103 and the voltage level across the second capacitor 104 may be unbalanced. Therefore, in a preferred embodiment, the third bridge arm unit can be reused as a voltage balancing bridge arm when the rechargeable battery supplies power. By controlling the third insulated gate bipolar transistor 132 and the fourth insulated gate bipolar transistor 133 of the third bridge arm unit to keep fast alternating complementary conduction (where a duty cycle may be, for example, 50%), the unbalanced voltage between the first capacitor 103 and the second capacitor 104 can be discharged to the neutral point N via the fourth bidirectional SCR 16 that is always turned on, so that an disadvantageous situation that the voltage level across the first capacitor 103 and the second capacitor 104 is unbalanced can be avoided.

FIG. 4 to FIG. 7 each show an equivalent circuit diagram of the multi-input power converter in the third operation mode. Because the inductor is quickly and alternately connected to the positive bus and the negative bus, and an induced electromotive force of the inductor prevents the current from sudden change, the inductor can be regarded as an open circuit to ground. When two transistors are quickly, alternately, and complementarily turned on, a magnitude of the induced electromotive force generated on the inductor is related to a rate of change of the current. If a voltage on one capacitor is higher, the induced electromotive force generated on the inductor is higher when the capacitor is connected to the neutral point via the inductor. This is equivalent to transferring electric energy from a higher voltage capacitor to a lower voltage capacitor by converting the energy to the induced electromotive force generated on the inductor.

Figure 4:
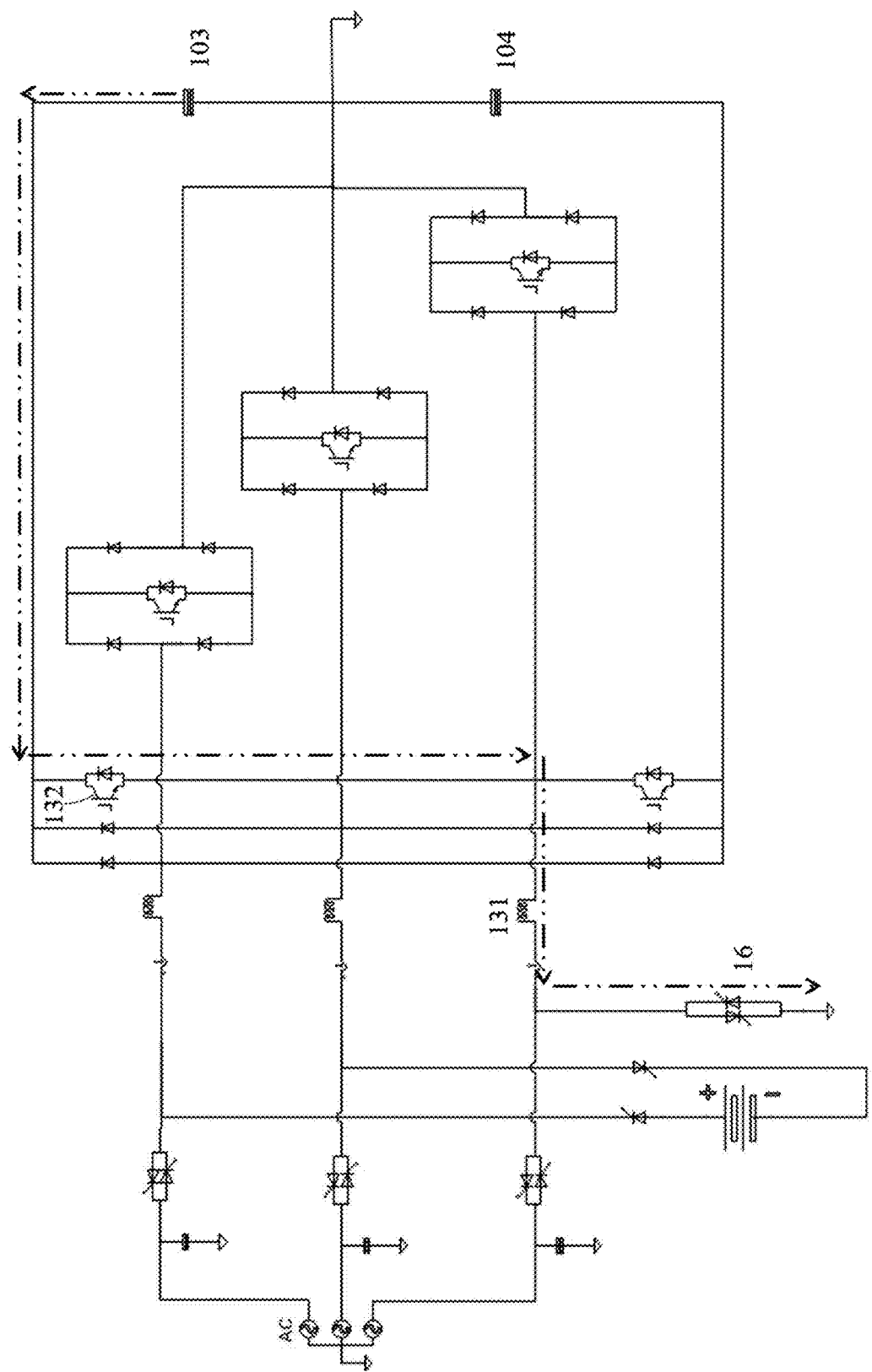
FIG. 4 to FIG. 7 each exemplarily show an equivalent circuit diagram of the multi-input power converter in a third operation mode, where FIG. 4 and FIG. 5 each show a case when the voltage across a first capacitor 103 is larger, and FIG. 6 and FIG. 7 each show a case when the voltage across a second capacitor 104 is larger.
Figure 5:
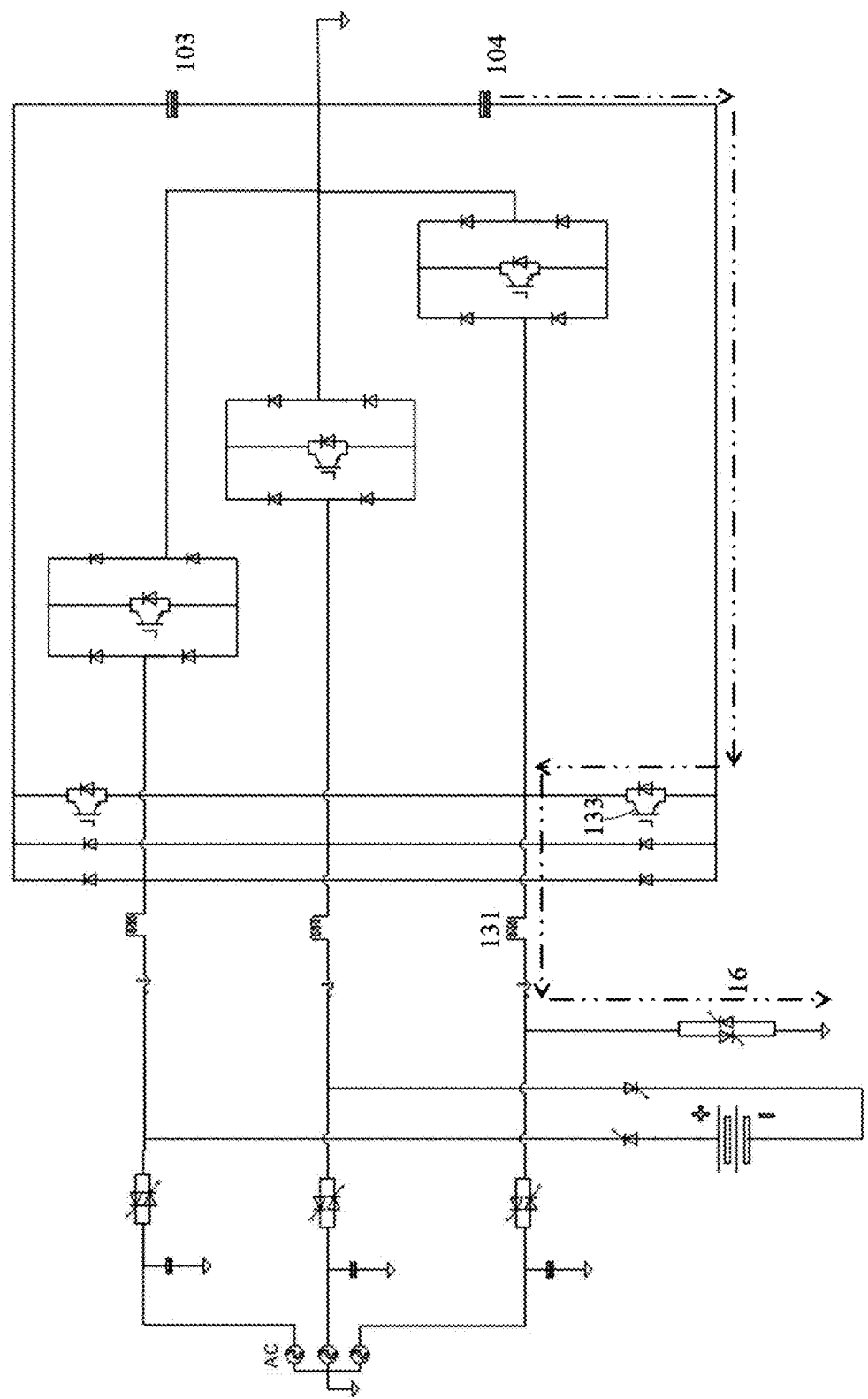

FIG. 4 and FIG. 5 each show a case when the voltage across the first capacitor 103 is larger. The third insulated gate bipolar transistor 132 is controlled to be turned on and the fourth insulated gate bipolar transistor 133 is controlled to be turned off. As shown in FIG. 4, a flow direction of a part of electric energy in the first capacitor 103 is: first capacitor 103→third insulated gate bipolar transistor 132→fourth bidirectional SCR 16→neutral point N. In this process, the first capacitor 103 stores energy into the third inductor 131. After that, the fourth insulated gate bipolar transistor 133 is controlled to be turned on and the third insulated gate bipolar transistor 132 is controlled to be turned off. Because the current in the third inductor 131 cannot change suddenly, as shown in FIG. 5, a current direction is: second capacitor 104→fourth insulated gate bipolar transistor 133 (internal diode thereof)→third inductor 131→fourth bidirectional SCR 16→neutral point N. In this process, the third inductor 131 charges electric energy into the second capacitor 104.

Figure 6:
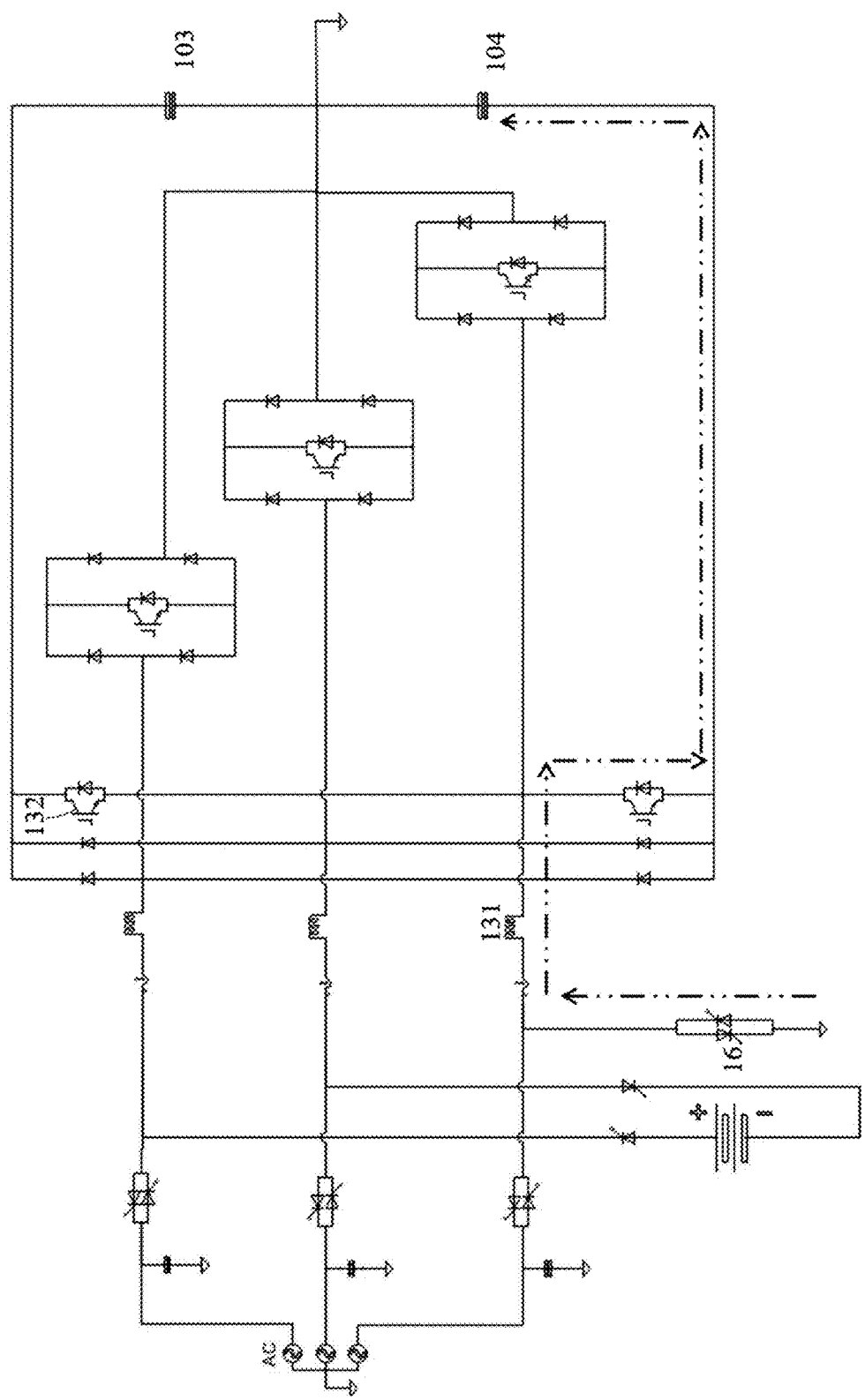
Figure 7:
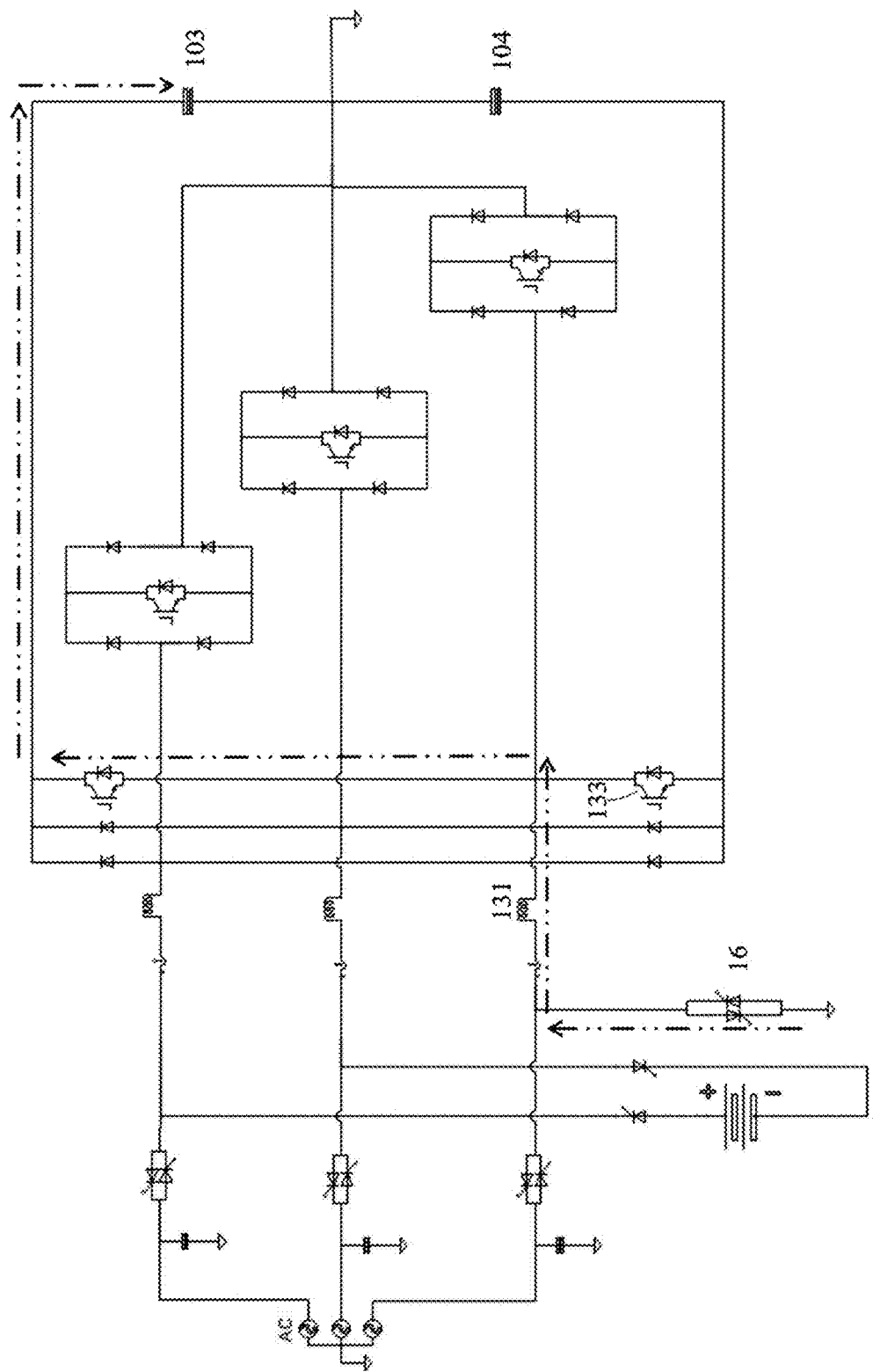

FIG. 6 and FIG. 7 each show a case when the voltage across the second capacitor 104 is larger. The third insulated gate bipolar transistor 132 is controlled to be turned off and the fourth insulated gate bipolar transistor 133 is controlled to be turned on. As shown in FIG. 6, a current flow direction is: neutral point N→fourth bidirectional SCR 16→third inductor 131→fourth insulated gate bipolar transistor 133→second capacitor 104. In this process, the second capacitor 104 charges the third inductor 131. After that, the third insulated gate bipolar transistor 132 is controlled to be turned on or turned off (where the current can flow through the anti-parallel diode on 132 in an off case), and the fourth insulated gate bipolar transistor 133 is controlled to be turned off. Because the current in the third inductor 131 cannot change suddenly, as shown in FIG. 7, a current flow direction is: neutral point N→fourth bidirectional SCR 16→third inductor 131→third insulated gate bipolar transistor 132 (where the current flows through the anti-parallel diode on 132 when 132 is turned off)→first capacitor 103. In this process, the third inductor 131 charges electric energy into the first capacitor 103.

When the third insulated gate bipolar transistor 132 and the fourth insulated gate bipolar transistor 133 are alternately turned on, a capacitor having a higher voltage charges the third inductor 131, and the third inductor 131 charges another capacitor having a lower voltage. In this way, the voltage across the first capacitor 103 and the second capacitor 104 are balanced.

When the load is powered by the rechargeable battery 18, and L1, L2, and L3 of the three-phase alternating current power supply recover from an abnormal state, the first bidirectional SCR 141, the second bidirectional SCR 142, and the third bidirectional SCR 143 in the alternating current switch group may be controlled to switch from the off state to the on state, the first unidirectional SCR 151 and the second unidirectional SCR 152 in the direct current switch group are controlled to switch from the on state to the off state, and the fourth bidirectional SCR 16 is controlled to switch from the on state to the off state. In this case, the three-phase alternating current power supply supplies power to the load via the power converter. After that, the operation mode is similar to the first operation mode, and details are not described herein again.

It should be noted that, the above-mentioned operation mode in this embodiment can be implemented by a controller disposed outside the power converter. To highlight a key point of descriptions, the controller that performs the operation mode is not described in detail in each embodiment of the present disclosure. Based on the teachings in this specification, a person having ordinary skill in the art readily understands how to implement the controller. Wherein, the controller obtains, in real time by means of at least one of the first current transformer, the second current transformer, and the third current transformer, the magnitude of the current of the power converter input from the L1, L2, and L3 phases of the three-phase alternating current power supply, to determine whether the multi-input power converter can normally obtain the alternating current power from the mains electricity. When the alternating current power can be normally obtained, on-off states of switching transistors in the three bridge arm units, the direct current switch group, and the alternating current switch group are controlled to rectify the alternating current power into direct current power to supply power to the positive direct current bus and the negative direct current bus; or when an alternating current power failure occurs, on-off states of the direct current switch group, the alternating current switch group, and switching transistors of the two bridge arm units that are connected to the rechargeable battery and that are used as battery mounting bridge arms are controlled to disconnect the multi-input power converter from the mains electricity and supply the direct current power of the rechargeable battery to the positive direct current bus and the negative direct current bus; or in the battery power supply mode, an on-off state of a switching transistor of the third bridge arm unit that is not used as the battery mounting bridge arm is controlled to balance the voltage levels on the two bus capacitors; or after the mains electricity is recovered to normal, on-off states of switching transistors in the three bridge arm units, the direct current switch group, and the alternating current switch group are controlled to disconnect the multi-input power converter from the rechargeable battery, rectify the alternating current power of the mains electricity into the direct current power, and supply the direct current power to the positive direct current bus and the negative direct current bus.

The power converter according to this embodiment has features of a Vienna rectifier circuit, a simple circuit, less power components, improved power density, and reduced current distortion. In addition, this reduces a switching loss and control complexity.

According to the power converter in this embodiment, a mains electricity input circuit required for an online mode and a battery mounting circuit required for a battery power supply mode are efficiently and beneficially integrated, and a quantity of power elements required in a circuit is reduced as much as possible. In particular, a quantity of switching transistors and inductive elements such as the insulated gate bipolar transistors is greatly reduced. This not only reduces costs, but also facilitates miniaturization of the power converter.

In an embodiment of the present disclosure, an IGBT with an anti-parallel diode may alternatively be replaced with a plurality of similar variations. For example, the IGBT with an anti-parallel diode is externally provided with an independent anti-parallel diode or replaced with an IGBT which is not provided with an anti-parallel diode per se but is externally provided with an independent anti-parallel diode. In a more preferred embodiment, the first diode to the sixteenth diode 1344 are 650V diodes. The first insulated gate bipolar transistor 1145, the second insulated gate bipolar transistor 1245, and the fifth insulated gate bipolar transistor 1345 of each of the three bridge arm units are 650 v insulated gate bipolar transistors. The third insulated gate bipolar transistor 132 and the fourth insulated gate bipolar transistor 133 in the third bridge arm unit are 1200 v insulated gate bipolar transistors; or the first insulated gate bipolar transistor to the fifth insulated gate bipolar transistor 1345 are all 650 v insulated gate bipolar transistors. Table 1 shows a quantity comparison of a quantity of electronic components of the power converter according to this embodiment and the conventional 3-level topology.

|  | 650 V insulated gate bipolar transistor (50 A) | 650 V diode (50 A) | Inductor (50 A) | Relay (50 A) | SCR (50 A) | 1200 V insulated gate bipolar transistor (20 A) | Inductor (25 A) |
|---|---|---|---|---|---|---|---|
| Conventional 3-level topology | 22 | 10 | 7 | 7 | 0 | 0 | 0 |
| Topology in this embodiment | 3 | 16 | 3 | 0 | 6 | 4 | 1 |

According to the multi-input power converter in another embodiment of the present disclosure, this embodiment differs from the first embodiment in that the first bidirectional SCR 141, the second bidirectional SCR 142, and the third bidirectional SCR 143 in the alternating current switch group, the first unidirectional SCR 151 and the second unidirectional SCR 152 in the direct current switch group, and the fourth bidirectional SCR 16 used as the freewheeling switch are all replaced with the relay. In addition, the switch element in the alternating current switch group, the direct current switch, or the freewheeling switch may be a mechanical contact switch, or may be an electronic controllable switch.

Although in various embodiments, the current unidirectional conductive circuit connected between the positive direct current bus and the negative direct current bus on the first bridge arm unit 11 or the second bridge arm unit 12 includes two diodes connected in series in a same direction, for example, the first diode 112 and the second diode 113 in the first bridge arm unit 11 shown in FIG. 1, the circuit may alternatively be replaced with another circuit element that enables the current direction to be defined from the negative direct current bus to the positive direct current bus.

The first bidirectional switch unit 114, the second bidirectional switch unit 124, and the third bidirectional switch unit 134 may be replaced with other bidirectional controllable switch units in a current direction. In other embodiments of the present disclosure, the insulated gate bipolar transistor may alternatively be replaced by a controllable switching transistor such as a metal-oxide-semiconductor field-effect transistor.

In another embodiment of the present disclosure, a control module of a multi-input current converter may be configured empirically to perform the voltage balancing mode at intervals or continuously. Alternatively, a detection module may be additionally disposed to detect a feature such as a voltage of the multi-input current converter and output a detection result signal to the control module, and the control module controls an operation mode of the multi-input current converter based on the detection result signal provided by the detection module. For example, voltage detection components are disposed at the positive direct current bus and the negative direct current bus, and the control module of the multi-input current converter is configured to determine whether to start the voltage balancing mode based on detection data of the voltage detection components.

Although a preferred embodiment in which the first bridge arm unit 11 and the second bridge arm unit 12 form a loop in the battery mode with the rechargeable battery as battery mounting bridges is shown in FIG. 1, the present disclosure is not limited to this example. Any two of the three bridge arm units can be connected to the rechargeable battery as battery mounting bridges. In this case, the remaining bridge arm unit is used as a corresponding capacitive voltage balancing bridge arm, and connected to the neutral point via a bidirectional controllable switch.

The present disclosure further provides an uninterruptible power supply, including the foregoing multi-input power converter, a rechargeable battery, and an inverter. A positive terminal and a negative terminal at an input end of the inverter are respectively connected to a positive direct current bus and a negative direct current bus, and an output end of the inverter is configured to provide a required alternating current for a load.

Although the present disclosure has been described by preferred embodiments, the present disclosure is not limited to embodiments described herein and includes changes and variations made without departing from the scope of the present disclosure.

What is claimed:

1. A multi-input power converter, wherein the multi-input power converter obtains power from a three-phase alternating current power supply or a rechargeable battery and outputs direct current power to a positive direct current bus and a negative direct current bus, wherein a first capacitor and a second capacitor are connected in series between the positive direct current bus and the negative direct current bus, and a first node formed by connecting the first capacitor to the second capacitor is connected to a neutral point;
the multi-input power converter comprises a first bridge arm unit, a second bridge arm unit, and a third bridge arm unit, and each bridge arm unit comprises an inductor and a bidirectional switch unit that are connected in series, and a current direction control bridge arm connected between the positive direct current bus and the negative direct current bus, wherein a first end of the inductor is connected to a corresponding phase of the three-phase alternating current power supply, a second node formed by connecting a second end of the inductor to a first end of the bidirectional switch unit is connected to a corresponding current direction control bridge arm, and a second end of the bidirectional switch unit is connected to the first node;
wherein, a first end of an inductor of the first bridge arm unit is connected to a positive electrode of the rechargeable battery via a first direct current switch, and a first end of an inductor of the second bridge arm unit is connected to a negative electrode of the rechargeable battery via a second direct current switch, so that the positive direct current bus and the negative direct current bus can be powered by the rechargeable battery; and a first end of an inductor of the third bridge arm unit is connected to the neutral point via a bidirectional conductive switch, and a current direction control bridge arm of the third bridge arm unit comprises a bidirectional controllable element, wherein the bidirectional controllable element is controlled to enable a second end of the inductor of the third bridge arm unit to alternately connect to one of the positive direct current bus and the negative direct current bus.

2. The multi-input power converter of claim 1, wherein respective current direction control bridge arms of the first bridge arm unit, the second bridge arm unit, and the third bridge arm unit each are configured to enable a current to flow in a direction from the negative direct current bus to the positive direct current bus, wherein, the current direction control bridge arm of the first bridge arm unit and the current direction control bridge arm of the second bridge arm unit each comprise a first unidirectional conductive element and a second unidirectional conductive element that are connected in series in a same direction, and a node formed by connecting the first unidirectional conductive element to the second unidirectional conductive element is a second node of a corresponding bridge arm unit; and the current direction control bridge arm of the third bridge arm unit comprises a first bidirectional controllable element and a second bidirectional controllable element that are connected in series in a same direction, and the first bidirectional controllable element and the second bidirectional controllable element are further configured to control the current to flow in a direction from the positive direct current bus to the negative direct current bus.

3. The multi-input power converter of claim 2, wherein the first bidirectional controllable element of the third bridge arm unit is a first transistor with an anti-parallel diode, the second bidirectional controllable element is a second transistor with an anti-parallel diode, and the first transistor and the second transistor are configured to control the current to flow in the direction from the positive direct current bus to the negative direct current bus.

4. The multi-input power converter of claim 3, wherein in response to the positive direct current bus and the negative direct current bus being powered by the rechargeable battery, the third bridge arm unit is configured to keep the bidirectional conductive switch on, and the first transistor and the second transistor are alternately and complementarily turned on, to enable the voltage across the first capacitor and the voltage across the second capacitor tend to be balanced.

5. The multi-input power converter of claim 4, wherein duty cycles of alternating complementary conduction of the first transistor and the second transistor each are 50%.

6. The multi-input power converter of claim 1, wherein in a battery mode, the first bridge arm unit and the second bridge arm unit are configured to alternately perform the following operations:

enabling bidirectional switch units of the first bridge arm unit and the second bridge arm unit to be turned on simultaneously, and constituting a direct current loop with the rechargeable battery, so that the inductor of the first bridge arm unit and the inductor of the second bridge arm unit store energy; and enabling the bidirectional switch units of the first bridge arm unit and the second bridge arm unit to be turned off simultaneously, so that the rechargeable battery, the inductor of the first bridge arm unit, the inductor of the second bridge arm unit, the first capacitor, and the second capacitor are connected in series, to supply power to the positive direct current bus and the negative direct current bus.

7. The multi-input power converter of claim 1, wherein the bidirectional conductive switch is a bidirectional silicon controlled rectifier (SCR) or a relay; or at least one of the first direct current switch and the second direct current switch is a unidirectional SCR.

8. The multi-input power converter of claim 1, wherein the multi-input power converter comprises a control module and a collection module configured to collect an electrical signal of the multi-input power converter, wherein the control module controls, based on the electrical signal, the multi-input power converter to switch between a mains electricity mode and the battery mode, or controls, in the battery mode, an on-off state of the bidirectional controllable element of the third bridge arm unit, to enable the voltage across the first capacitor and the voltage across the second capacitor tend to be balanced.

9. The multi-input power converter of claim 1, wherein the bidirectional switch unit of each bridge arm unit comprises a first diode, a second diode, a third diode, a fourth diode, and a third transistor with an anti-parallel diode, wherein an anode of the first diode is connected to a cathode of the second diode, and a node formed by connecting the two diodes is used as the first end of the bidirectional switch unit;

an anode of the third diode is connected to a cathode of the fourth diode, and a node formed by connecting the two diodes is used as the second end of the bidirectional switch unit;

a cathode of the first diode is connected to a cathode of the third diode, and a node formed by connecting the two diodes is connected to a first end of the third transistor;

an anode of the second diode is connected to an anode of the fourth diode, and a node formed by connecting the two diodes is connected to a second end of the third transistor; and an on state of the third transistor enables the current to flow from the first end of the third transistor to the second end.

10. The multi-input power converter of claim 9, wherein the first transistor, the second transistor, or the third transistor is an insulated gate bipolar transistor or a metal-oxide-semiconductor field-effect transistor.

11. An uninterruptible power supply, comprising:
the multi-input power converter of claim 1;
a rechargeable battery, wherein a positive electrode and a negative electrode of the rechargeable battery are respectively connected to a positive direct current bus and a negative direct current bus via a first bridge arm unit and a second bridge arm unit; and
an inverter, wherein a positive terminal and a negative terminal at an input end of the inverter are respectively connected to the positive direct current bus and the negative direct current bus, and an output end of the inverter is connected to an alternating current output end.

* * * * *